(12) United States Patent
Goel et al.

(10) Patent No.: US 11,604,869 B2
(45) Date of Patent: Mar. 14, 2023

(54) METHOD AND ELECTRONIC DEVICE FOR PROVIDING AUTHENTICATION USING AN IMAGE SENSOR

(71) Applicant: SAMSUNG ELECTRONICS CO., LTD., Suwon-si (KR)

(72) Inventors: Manish Goel, Bengaluru (IN); Angel Mary Lourdu, Bangalore (IN); Ayush Goel, Uttar Pradesh (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 184 days.

(21) Appl. No.: 17/104,096

(22) Filed: Nov. 25, 2020

(65) Prior Publication Data

US 2021/0157898 A1    May 27, 2021

(30) Foreign Application Priority Data

Nov. 26, 2019    (IN) .......................... IN201941048293
Nov. 23, 2020    (IN) ........................ IN2019 41048293

(51) Int. Cl.
G06F 21/45    (2013.01)
H04N 5/369    (2011.01)

(52) U.S. Cl.
CPC ......... *G06F 21/45* (2013.01); *H04N 5/36963* (2018.08)

(58) Field of Classification Search
CPC ............................... G06F 21/45; H04L 9/3278
See application file for complete search history.

(56) References Cited

U.S. PATENT DOCUMENTS

| 10,382,708 B2 | 8/2019 | Takayanagi et al. | |
| 2018/0115723 A1* | 4/2018 | Takayanagi | ....... H01L 27/14609 |
| 2019/0121955 A1* | 4/2019 | Facon | ................... H04L 9/3278 |
| 2020/0267341 A1* | 8/2020 | Baba | ...................... H04N 5/369 |
| 2020/0288078 A1* | 9/2020 | Okura | .................. H04L 9/0869 |
| 2021/0157898 A1* | 5/2021 | Goel | ....................... G06F 21/73 |
| 2021/0366961 A1* | 11/2021 | Yanagita | .......... H01L 27/14627 |

OTHER PUBLICATIONS

Y. Cao et al., "CMOS Image Sensor Based Physical Unclonable Function for Coherent Sensor-Level Authentication", IEEE Transactions on Circuits and Systems I: Regular Papers, vol. 62, Issue 11, Nov. 2015, pp. 2629-2640.

Y. Cao et al., "Using Image Sensor PUF as Root of Trust for Birthmarking of Perceptual Image Hash", IEEE Asian Hardware-Oriented Security and Trust, 2016, 7 pages.

* cited by examiner

*Primary Examiner* — Dao Q Ho
(74) *Attorney, Agent, or Firm* — F. Chau & Associates, LLC

(57) ABSTRACT

A method for providing authentication using an image sensor of an electronic device including: receiving, by the electronic device, a plurality of frames from the image sensor of the electronic device, wherein each frame includes a plurality of Optical Black (OB) pixels; determining, by the electronic device, a set of optimal OB pixels from the plurality of frames; and generating, by the electronic device, a unique key based on the set of optimal OB pixels for the authentication.

9 Claims, 5 Drawing Sheets

METHOD AND ELECTRONIC DEVICE FOR PROVIDING AUTHENTICATION USING AN IMAGE SENSOR

CROSS-REFERENCE TO RELATED APPLICATION

This application claims priority under 35 U.S.C. 119 to Indian provisional patent application no. 201941048293 filed on Nov. 26, 2019 and Indian patent application no. 201941048293 filed on Nov. 23, 2020, the disclosure of which are incorporated by reference herein in its entirety.

TECHNICAL FIELD

The present inventive concept relates to image processing, and more specifically to a method and electronic device for providing authentication using an image sensor.

DISCUSSION OF RELATED ART

In existing systems, a unique identification (ID) such as an international mobile equipment identity (IMEI) or an international mobile subscriber identity (IMSI) assigned to an electronic device such as a mobile device can be easily duplicated or changed. The unique ID may be obtained from an operating system (OS), and can be easily cloned, forged, or misused to tap or hack the electronic device. Further, a media access control (MAC) address, which is assigned when the electronic device is connected to a network, is intended to be permanently set and uniquely fixed worldwide so that the MAC address can be used as the unique ID of the electronic device. However, existing systems are capable of MAC spoofing by modifying the MAC address of the electronic device. As a consequence, the existing systems may not be able to guarantee the uniqueness of the identity of the electronic device.

SUMMARY

Exemplary embodiments of the inventive concept generate a physically unclonable function (PUF) (e.g., a unique key) based on an optical black (OB) pixel of a complementary metal oxide semiconductor (CMOS) image sensor of an electronic device for authentication without using an external hardware.

Exemplary embodiments of the inventive concept herein provide a method for providing authentication using an image sensor of an electronic device. The method includes receiving, by the electronic device, a plurality of frames from the image sensor of the electronic device, where each frame includes a plurality of OB pixels. An OB pixel may include reference pixels within the image sensor's pixel array that have virtually identical electrical characteristics as a standard active pixel, yet are insensitive to light. Further, the method includes determining, by the electronic device, a set of optimal OB pixels from the plurality of frames. Further, the method includes generating, by the electronic device, a unique key based on the set of optimal OB pixels for the authentication.

In an embodiment of the inventive concept, the method further includes determining, by the electronic device, location information of a plurality of candidate OB pixels in a first frame of the plurality of frames, where the plurality of candidate OB pixels are obtained from the plurality of OB pixels. Candidate OB pixels may be pixels whose values are above a threshold range, and the threshold is a tunable parameter which varies with the image sensor. Further, the method includes storing, by the electronic device, the location information of the plurality of candidate OB pixels. Further, the method includes determining, by the electronic device, location information of a plurality of candidate OB pixels in remaining frames of the plurality of frames. Further, the method includes performing, by the electronic device, an intersection on the stored location information using the location information of the plurality of candidate OB pixels of the remaining frames. Further, the method includes determining, by the electronic device, the set of optimal OB pixels based on the intersection.

In an embodiment of the inventive concept, the method further includes determining, by the electronic device, location information of a plurality of OB pixels in the first frame of the plurality of frames. Further, the method includes storing, by the electronic device, the location information of the plurality of OB pixels and a corresponding dark current value of the plurality of OB pixels. For example, the dark current may be proportional to temperature. Because of a structural/process variation among the OB Pixels, the dark current may change in magnitude based on the location information. Further, the method includes determining, by the electronic device, location information of a plurality of OB pixels and a corresponding dark current value of the plurality of OB pixels in remaining frames of the plurality of frames. Further, the method includes performing, by the electronic device, an addition between the stored dark current value of the plurality of OB pixels and the dark current value of the plurality of OB pixels of the remaining frames and storing an average information of the addition. Further, the method includes determining, by the electronic device, the set of optimal OB pixels based on the average information, where the set of optimal OB pixels is a high value set of the stored addition information.

In an embodiment of the inventive concept, the method further includes determining, by the electronic device, the location information of the plurality of OB pixels in the first frame of the plurality of frames. Further, the method includes storing, by the electronic device, the location information of the plurality of OB pixels and a corresponding dark current value of the plurality of OB pixels, where the stored location information is a high value set of the first frame. Further, the method includes determining, by the electronic device, the location information of the plurality of OB pixels and a corresponding dark current value of the plurality of OB pixels in remaining frames of the plurality of frames. Further, the method includes performing, by the electronic device, the addition between the stored dark current value of the plurality of OB pixels and the dark current value of the plurality of OB pixels of the remaining frames and storing the addition information. Further, the method includes determining, by the electronic device, the set of optimal OB pixels based on the addition, where the set of optimal OB pixels is a high value set of the stored addition information.

In an embodiment of the inventive concept, the plurality of OB pixels are present on an active pixel array of the image sensor of the electronic device. In an embodiment of the inventive concept, the method further includes generating, by the electronic device, a plurality of parity bits from the unique key. Further, the method includes detecting an error based on the plurality of parity bits.

Accordingly, exemplary embodiments disclosed herein provide an electronic device for providing authentication using an image sensor of the electronic device. The electronic device includes a processor, a memory and an authentication engine, where the authentication engine is coupled with the processor and the memory. The authentication engine is configured to receive the plurality of frames from the image sensor of the electronic device, where each frame includes the plurality of OB pixels. Further, the authentication engine is configured to determine the set of optimal OB pixels from the plurality of frames. Further, the authentication engine is configured to generate the unique key based on the set of optimal OB pixels for the authentication.

An exemplary embodiment of the inventive concept further provides a method for providing authentication using an image sensor of an electronic device, the method including: receiving, at the electronic device, a plurality of frames from the image sensor, each of the frames including a plurality of OB pixels; determining, by the electronic device, a set of OB pixels by performing an operation using location information of the OB pixels of the received frames; and generating a PUF key based on the set of OB pixels.

BRIEF DESCRIPTION OF THE DRAWINGS

The above and other features of the inventive concept will be more clearly understood by describing in detail exemplary embodiments thereof with reference to the accompanying drawings, in which.

DETAILED DESCRIPTION OF THE EMBODIMENTS

Figure 1:
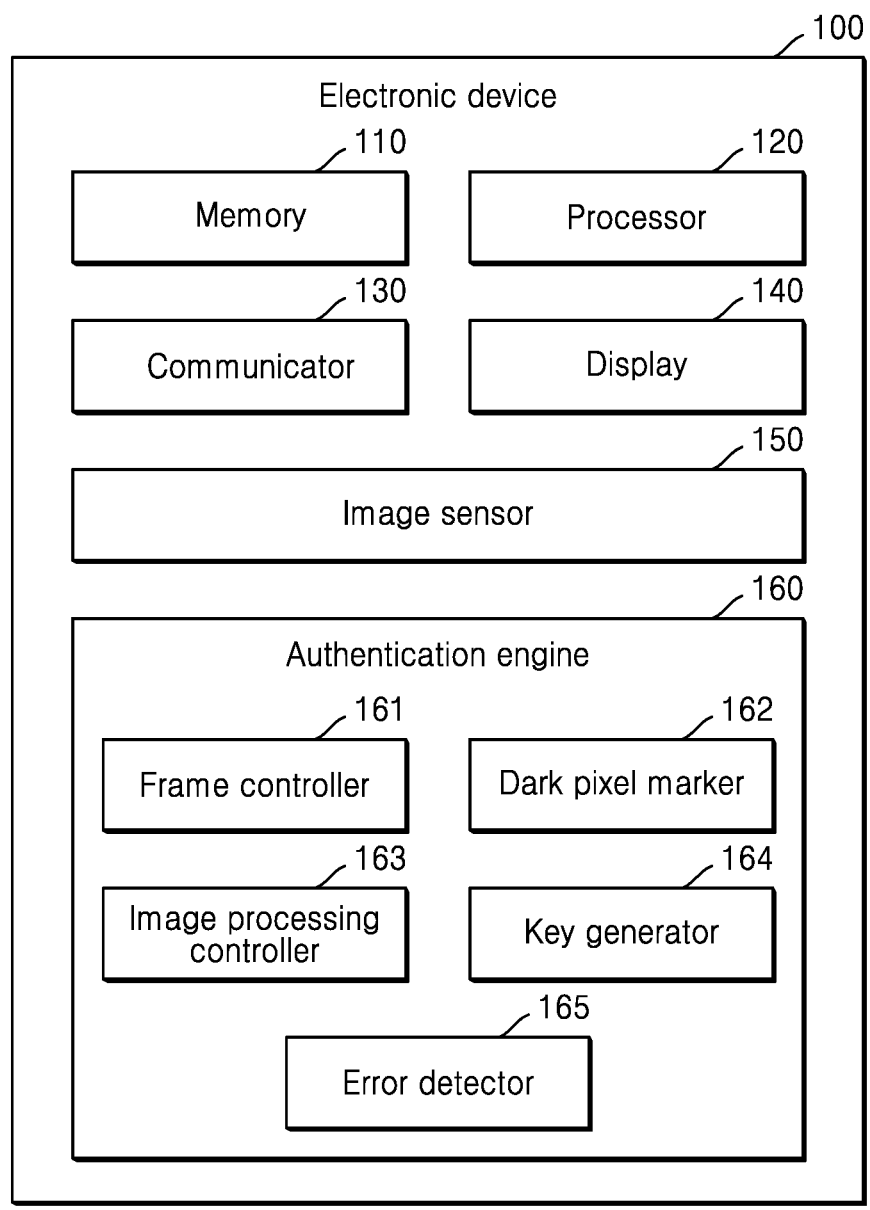
FIG. 1 illustrates a block diagram of an electronic device for providing authentication using an image sensor of the electronic device, according to exemplary embodiments of the inventive concept.

Hereinafter exemplary embodiments of the inventive concept will be explained more fully with reference to the accompanying drawings. However, as those skilled in the art would realize, the described embodiments may be modified in various different ways, and thus, should not be limited to the embodiments set forth herein. In addition, the various embodiments described herein are not necessarily mutually exclusive, as some embodiments can be combined with one or more other embodiments to form new embodiments.

In this disclosure, the embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. In addition, the blocks of the embodiments may be physically combined into more complex blocks.

Exemplary embodiments of the inventive concept disclosed herein provide a method for providing authentication using an image sensor of an electronic device. The method includes receiving, by the electronic device, a plurality of frames from the image sensor of the electronic device, where each frame includes a plurality of optical black (OB) pixels. Further, the method includes determining, by the electronic device, a set of optimal OB pixels from the plurality of frames. Further, the method includes generating, by the electronic device, a unique key based on the set of optimal OB pixels for the authentication. Further, each pixel in the image sensor (e.g., a complementary metal oxide semiconductor CMOS sensor) is made up of transistors and each transistor has unique physical variations that occur naturally during a semiconductor manufacturing process. The unique physical variations are unpredictable and uncontrollable, which makes the unique physical variations impossible to clone the unique key (e.g., a physically unclonable function PUF key).

Accordingly, the embodiments of the inventive concept disclosed herein provide the electronic device for providing the aforementioned authentication using the image sensor of the electronic device. The electronic device includes a processor, a memory and an authentication engine, where the authentication engine is coupled with the processor and the memory. The authentication engine is configured to receive the plurality of frames from the image sensor of the electronic device, where each frame includes the plurality of OB pixels. Further, the authentication engine is configured to determine the set of optimal OB pixels from the plurality of frames. Further, the authentication engine is configured to generate the unique key based on the set of optimal OB pixels for the authentication.

Referring now to FIGS. 1 through 5, exemplary embodiments of the inventive concept will be described. In the drawings, similar reference characters may denote similar elements and/or features.

FIG. 1 illustrates a block diagram of an electronic device (100) for providing authentication using an image sensor (150) of the electronic device (100), according to exemplary embodiments of the inventive concept. The electronic device (100) can be, for example, but is not limited to, a smart phone, a laptop, a smart television (TV), smart phone cameras, web cameras, modern digital pocket cameras, digital single-lens reflex cameras (DSLRs), and mirror less interchangeable-lens cameras (MILCs). In an embodiment of the inventive concept, the electronic device (100) includes a memory (110), a processor (120), a communicator (130), a display (140), an image sensor (150) and an authentication engine (160).

The memory (110) stores instructions to be executed by the processor (120). The memory (110) may include non-volatile storage elements. Examples of such non-volatile storage elements may include magnetic hard discs, optical discs, floppy discs, flash memories, or forms of electrically programmable read only memory memories (EPROM) or electrically erasable and programmable read only memories (EEPROM). In addition, the memory (110) may, in some examples, be a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information than a data storage space of the memory (110). In certain examples, a non-transitory storage medium may store data that can, over time, change (e.g., in random access memory (RAM) or cache). In an embodiment of the inventive concept, the memory (110) can be an internal storage unit or an external storage unit of the electronic device (100), a cloud storage, or any other type of external storage.

The processor (120) communicates with the memory (110), the communicator (130), the display (140), the image sensor (150), and the authentication engine (160). The processor (120) is configured to execute instructions stored in the memory (110) and to perform various processes. The processor (120) may include one or a plurality of processors, may be a general purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU). The communicator (130) is configured to communicate internally between internal hardware components (e.g., the memory (110), the processor (120), the display (140), the image sensor (150) and the authentication engine (160)) of the electronic device (100). The communicator (130) is configured to communicate the electronic device (100) with external devices via one or more networks.

In an embodiment of the inventive concept, the authentication engine (160) includes a frame controller (161), a dark pixel marker (162), an image processing controller (163), a key generator (164), and an error detector (165). The authentication engine (160) is implemented by processing circuitry such as logic gates, integrated circuits, microprocessors, microcontrollers, memory circuits, passive electronic components, active electronic components, optical components, hardwired circuits, or the like, and may be driven by firmware. The circuits may, for example, be embodied in one or more semiconductor chips, or on substrate supports such as printed circuit boards and the like. The frame controller (161) receives a plurality of frames from the image sensor (150) of the electronic device (100). A frame may include a plurality of OB pixels present on an active pixel sensor (APS) (e.g., image sensor (150)). Different types of APS include an N-type metal-oxide-semiconductor (NMOS) APS, a CMOS APS, etc. The CMOS APS is also known as the CMOS sensor (or CIS), which is widely used in digital camera technologies such as smart phone cameras, web cameras, modern digital pocket cameras, DSLRs, and MILCs. Further, the frame controller (161) may pass one frame at a time from the plurality of the frames to the image processing controller (163).

The dark pixel marker (162) determines location information of a plurality of candidate OB pixels and a plurality of OB pixels in the received frames from the image sensor (150) of the electronic device (100). Further, the dark pixel marker (162) stores the location information of the plurality of candidate OB pixels, the plurality of OB pixels and a corresponding dark current value of the plurality of OB pixels in the memory (110).

The image processing controller (163) performs an intersection operation on the stored location information of the plurality of candidate OB pixels of a first frame of the plurality of frames using the location information of the plurality of candidate OB pixels of remaining frames of the plurality of frames. Further, the image processing controller (163) determines a set of optimal OB pixels based on the intersection. For example, let there be a set "S1" of candidate pixel locations from the first frame "F1", S1={a1,a2, b1,b2,b3}. Let there be a set "S2" of candidate pixel locations from a second frame "F2", S2={a1, b1, b3, b4}. Let R be the set of optimal OB pixels after the intersection of the S1 and S2, then R is {a1, b1, b3}. In this example, the set of optimal OB pixels includes those pixels found in both sets "S1" and "S2". This will likewise be extended to the remaining frames.

Further, the image processing controller (163) performs an addition operation between the stored dark current value of the plurality of OB pixels of the plurality of OB pixels of the first frame of the plurality of frames and the determined dark current value of the plurality of OB pixels of the remaining frames of the plurality of frames and stores an average information of the addition in the memory (110). Further, the image processing controller (163) determines the set of optimal OB pixels based on the addition, the set of optimal OB pixels is a higher value set of the stored average information. For example, let there be the first frame "F1" and the buffer "S1" (e.g., the memory (110)) which stores the OB pixel value (e.g., a dark current value) and OB pixel location of the first frame "F1". Now for the second frame "F2", the OB pixel value of the second frame "F2" added to the buffer "S1" at their respective locations, and average is calculated. The calculated average of top "K pixel" forms the set of optimal OB pixels. This will likewise be extended to the remaining frames.

Further, the image processing controller (163) performs the addition between the stored dark current value of the plurality of OB pixels (e.g., a higher value set of the first frame) and the determined dark current value of the plurality of OB pixels of the remaining frames and stores the resulting addition information in the memory (110). Further, the image processing controller (163) determines the set of optimal OB pixels based on the addition, where the set of optimal OB pixels is a higher value set of the stored addition information. For example, let there be the first frame "F1" and the buffer "S1" which stores the OB pixel value and OB pixel location of the first frame "F1" for only top "L pixel location" of the first frame "F1" (e.g., not processing the entire OB region of the first frame "F1"). Now for the second frame "F2", the OB pixel value and OB pixel location determines from the same top "L pixel location" as stored during the first frame "F1", and is then used to calculate the average. This will likewise be extended to the remaining frames. Instead of running on the whole OB region, this method is only performed on a limited collection of OB pixels, which is effective in terms of memory and can be applied in a real time system.

The key generator (164) generates the unique key based on the set of optimal OB pixels for the authentication. Once the optimal pixel set is generated from the image processing engine (163), the key generator (164) generates a binary key where 0 represents a pixel that is not an optimal pixel and 1 represents a pixel that is the optimal pixel. For example, consider there are 10 pixels. Now an optimal OB pixel set from the image processing engine (163) may be 1, 5, 91. The unique key for this scenario will be 0100010001. The error detector (165) detects an error related to a pixel value fluctuation due to a temperature variation. For example, consider "W" as row width for the image sensor (150), and "L" rows of the OB pixels. In this case, there are M=L*W of the OB pixels per frame and thus, a signature or key for sensor k is defined as per equation 1, $$X^k = [x_0, x_1, \ldots, x_{M-1}], x_i \in \{0,1\} \quad (1)$$

A value of pixels might change based on the temperature variation. Hence, helper data (or parity data) is used to restore the value of the pixel. Consider, for example, that t bits of error correction are added, and then m*t bits of parity are added, m being the size of the Finite Field (Galois Field) over which error correction code is defined. So that $M+m*t<2^m$ bose-chaudhuri-hocquenghem (BCH) codes result. The m*t bits of data are stored in a one-time-programmable (OTP) memory in the memory (110) at time 0, where the data is referred to as the helper data. The error detector (165) uses extra bits to detect the error beyond t bits for extra protection. The error correction (e.g., parity Generation BCH) provides reliability against the image sensor (150) aging along with temperature.

Although the FIG. 1 shows various hardware components of the electronic device (100), it is to be understood that other embodiments are not limited thereto. In other embodiments, the electronic device (100) may include fewer or more numbers of components. Further, the labels or names of the components are used only for illustrative purpose and does not limit the scope of the inventive concept. One or more components can be combined together to perform a same or substantially similar function to provide authentication using the image sensor (150) of the electronic device (100).

Figure 2:
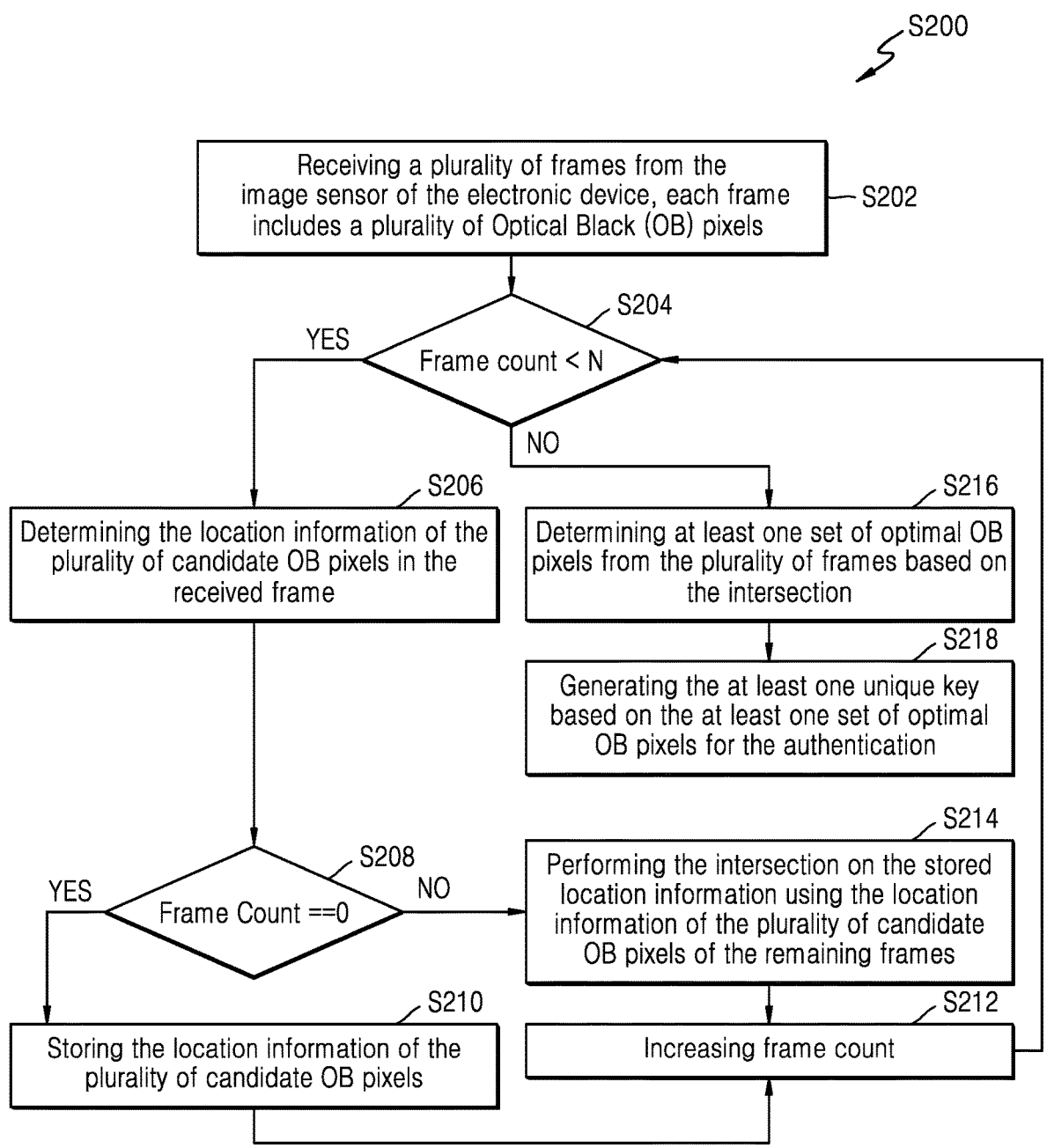
FIG. 2 is a flow diagram illustrating various operations for determining a set of optimal optical black (OB) pixels based on an intersection of multiple frames to provide authentication using the image sensor of the electronic device, according to exemplary embodiments of the inventive concept.

FIG. 2 is a flow diagram (S200) illustrating various operations for determining the set of optimal OB pixels based on the intersection of the multiple frames to provide authentication using the image sensor (150) of the electronic device (100), according to exemplary embodiments of the inventive concept. The operations (S202-S218) are performed by the authentication engine (160).

At S202, the method includes receiving the first frame of the plurality of frames (e.g., ten frames) from the image sensor (150) of the electronic device (100), where each frame includes the plurality of OB pixels. At an initial stage (e.g., when the first frame is received), a counter value is set to zero. At S204, the method includes determining whether a counter value during reception of the first frame is lower than a threshold value (e.g., N). At S206, the method includes determining the location information of the plurality of candidate OB pixels in the received frame (e.g., the first frame) in response to determining that the counter value during reception of the first frame is lower than the threshold value.

At S208, the method includes determining whether the received frame is the first frame of the plurality of the frames. At S210, the method includes storing the location information of the plurality of candidate OB pixels in the memory (110) in response to determining that the received frame is the first frame of the plurality of the frames. At S212, the method includes increasing the count value by one.

Now, in the second cycle for remaining frames (e.g., second frame, third frame, etc.), at S204, the method includes determining whether the counter value during reception of the remaining frames is lower than the threshold value. At S206, the method includes determining the location information of the plurality of candidate OB pixels in the remaining frames in response to determining that the counter value during reception of the remaining frames is lower than the threshold value. At S208, the method includes determining whether the remaining frames is the first frame of the plurality of the frames. At S214, the method includes performing the intersection operation on the stored location information using the location information of the plurality of candidate OB pixels of the remaining frames in response to determining that the received frame is not the first frame of the plurality of the frames. At S212, the method includes increasing the counter value by one. The second cycle, performs repeatedly until the counter value is lower than the threshold value. At S216, the method includes determining the set of optimal OB pixels from the plurality of frames based on the intersection in response to determining that the counter value is higher than the threshold value. At S218, the method includes generating the unique key based on the set of optimal OB pixels for the authentication.

Figure 3:
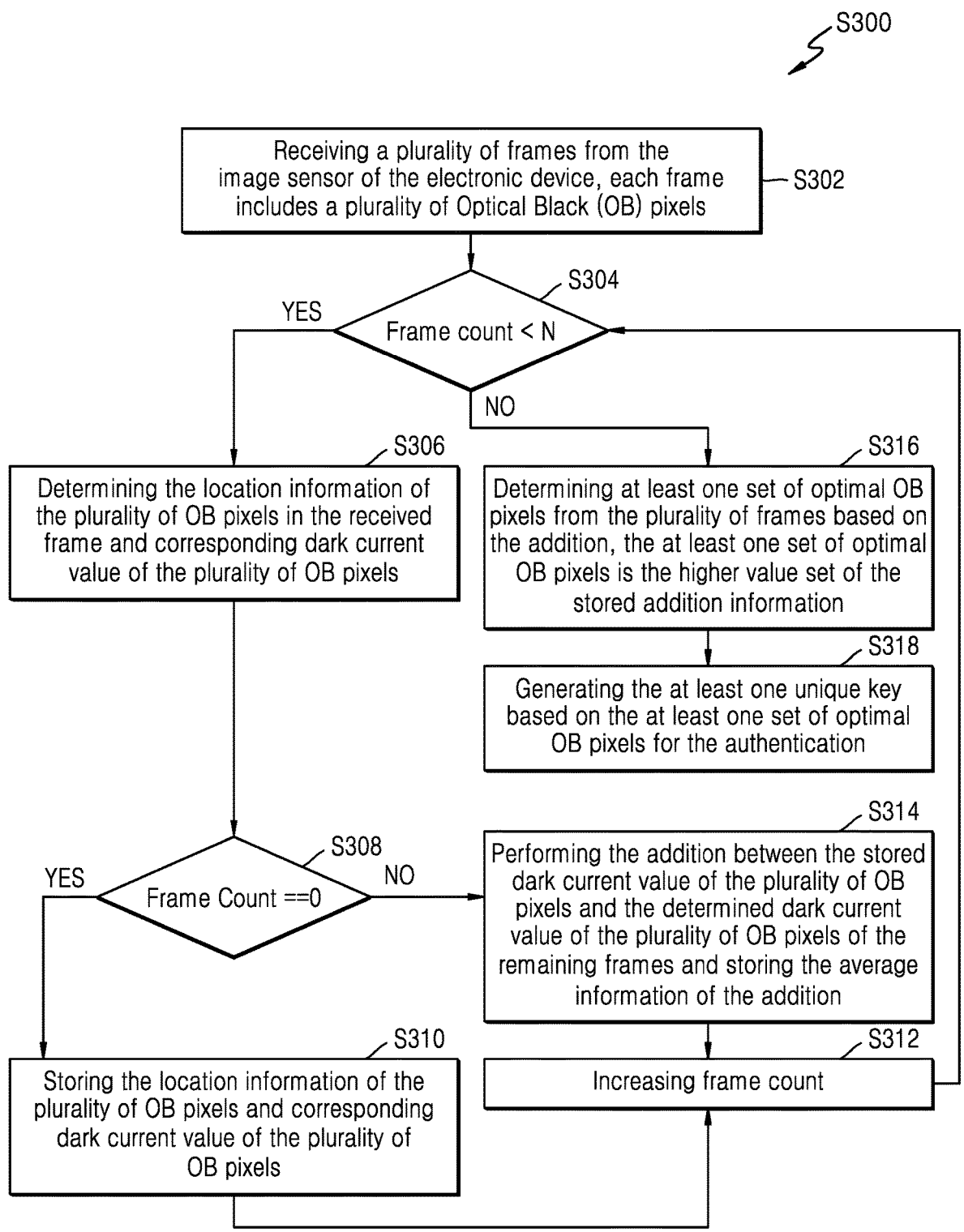
FIG. 3 is a flow diagram illustrating various operations for determining the set of optimal OB pixels based on an average information of the multiple frames to provide authentication using the image sensor of the electronic device, according to exemplary embodiments of the inventive concept.

FIG. 3 is a flow diagram (S300) illustrating various operations for determining the set of optimal OB pixels based on the average information of the multiple frames to provide authentication using the image sensor (150) of the electronic device (100), according to exemplary embodiments of the inventive concept. The operations (S302-S318) are performed by the authentication engine (160).

At S302, the method includes receiving the first frame of the plurality of frames (e.g., ten frames) from the image sensor (150) of the electronic device (100), where each frame includes the plurality of OB pixels. At an initial stage (e.g., when the first frame is received), a counter value is set to zero. At S304, the method includes determining whether a counter value during reception of the first frame is lower than a threshold value (e.g., N). At S306, the method includes determining the location information of the plurality of OB pixels in the received frame (e.g., the first frame) and corresponding dark current value of the plurality of OB pixels in response to determining that the counter value during reception of the first frame is lower than the threshold value.

At S308, the method includes determining whether the received frame is the first frame of the plurality of the frames. At S310, the method includes storing the location information of the plurality of OB pixels and corresponding dark current value of the plurality of OB pixels in the memory (110) in response to determining that the received frame is the first frame of the plurality of the frames. At S212, the method includes increasing the count value by one.

Now, in the second cycle for remaining frames (e.g., second frame, third frame, etc.), at S304, the method includes determining whether the counter value during reception of the remaining frames is lower than the threshold value. At S306, the method includes determining the location information of the plurality of OB pixels and corresponding dark current value of the plurality of OB pixels in the remaining frames in response to determining that the counter value during reception of the remaining frames is lower than the threshold value. At S308, the method includes determining whether the remaining frames is the first frame of the plurality of the frames. At S314, the method includes performing the addition operation between the stored dark current value of the plurality of OB pixels and the determined dark current value of the plurality of OB pixels of the remaining frames and storing the average information of the addition in response to determining that the received frame is not the first frame of the plurality of the frames. At S312, the method includes increasing the counter value by one. The second cycle performs repeatedly until the counter value is lower than the threshold value. At S316, the method includes determining the set of optimal OB pixels from the plurality of frames based on the average information in response to determining that the counter value is higher than the threshold value, the set of optimal OB pixels is a higher value set of the stored average information. At S318, the method includes generating the unique key based on the set of optimal OB pixels for the authentication.

Figure 4:
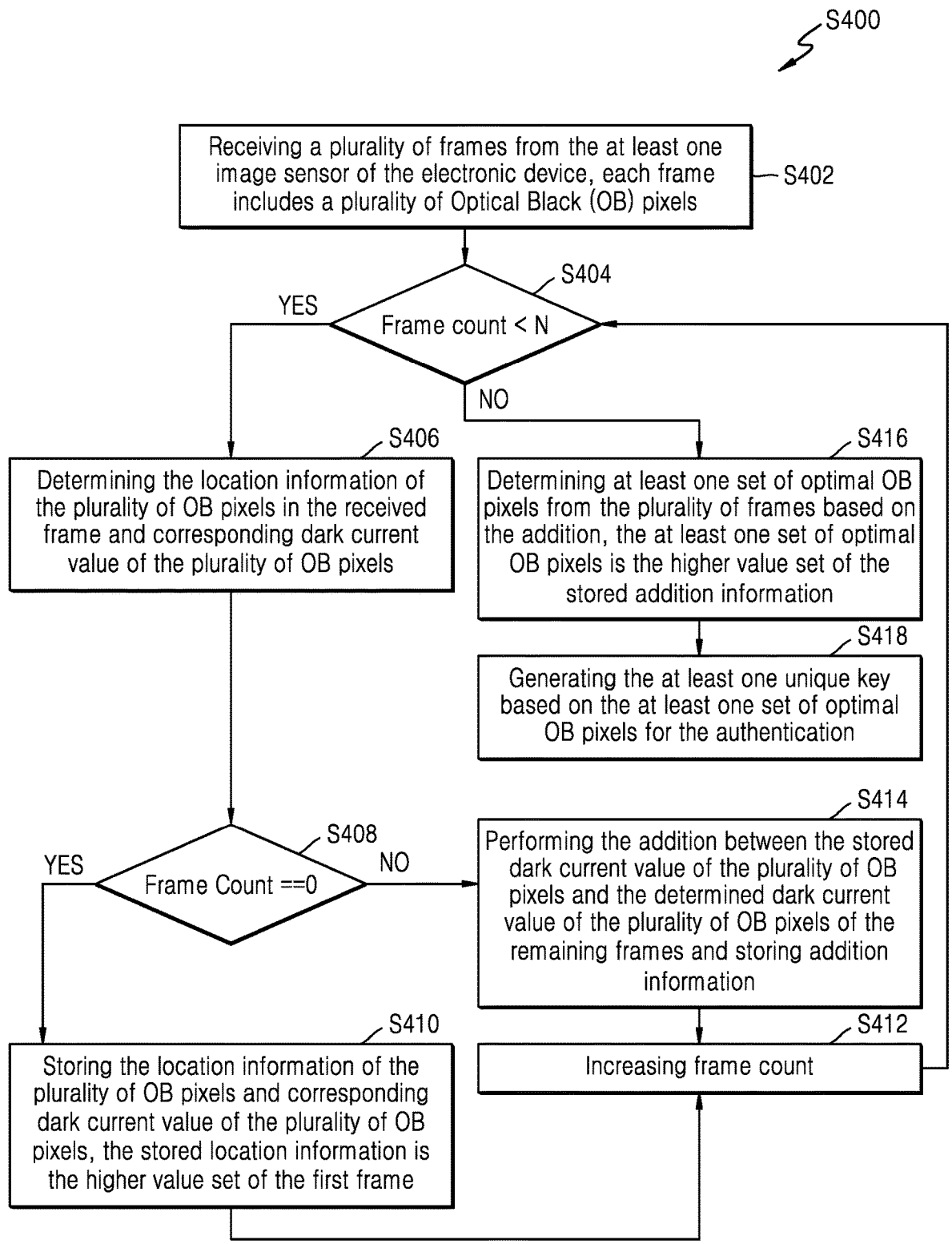
FIG. 4 is a flow diagram illustrating various operations for determining the set of optimal OB pixels based on addition information of the multiple frames for approximate processing to provide authentication using the image sensor of the electronic device, according to exemplary embodiments of the inventive concept.

FIG. 4 is a flow diagram (S400) illustrating various operations for determining the set of optimal OB pixels based on the addition information of the multiple frames for approximate processing to provide authentication using the image sensor (150) of the electronic device (100), according to exemplary embodiments of the inventive concept. The operations (S402-S418) are performed by the authentication engine (160).

At S402, the method includes receiving the first frame of the plurality of frames (e.g., ten frames) from the image sensor (150) of the electronic device (100), where each frame includes the plurality of OB pixels. At an initial stage (e.g., when the first frame is received), a counter value is set to zero. At S404, the method includes determining whether a counter value during reception of the first frame is lower than a threshold value (e.g., N). At S406, the method includes determining the location information of the plurality of OB pixels in the received frame (e.g., the first frame) and corresponding dark current value of the plurality of OB pixels in response to determining that the counter value during reception of the first frame is lower than the threshold value.

At S408, the method includes determining whether the received frame is the first frame of the plurality of the frames. At S410, the method includes storing the location information of the plurality of OB pixels and corresponding dark current value of the plurality of OB pixels in the memory (110), the stored location information is the higher value set of the first frame in response to determining that the received frame is the first frame of the plurality of the frames. At S412, the method includes increasing the count value by one.

Now, in the second cycle for remaining frames (e.g., second frame, third frame, etc.), at S404, the method includes determining whether the counter value during reception of the remaining frames is lower than the threshold value. At S406, the method includes determining the location information of the plurality of OB pixels and corresponding dark current value of the plurality of OB pixels in the remaining frames in response to determining that the counter value during reception of the remaining frames is lower than the threshold value. At S408, the method includes determining whether the remaining frames is the first frame of the plurality of the frames. At S414, the method includes performing the addition operation between the stored dark current value of the plurality of OB pixels and the determined dark current value of the plurality of OB pixels of the remaining frames and storing the addition information in response to determining that the received frame is not the first frame of the plurality of the frames. At S412, the method includes increasing the counter value by one. The second cycle performs repeatedly until the counter value is lower than the threshold value. At S416, the method includes determining the set of optimal OB pixels from the plurality of frames based on the addition information in response to determining that the counter value is higher than the threshold value, the set of optimal OB pixels is a higher value set of the stored addition information. At S418, the method includes generating the unique key based on the set of optimal OB pixels for the authentication.

Figure 5:
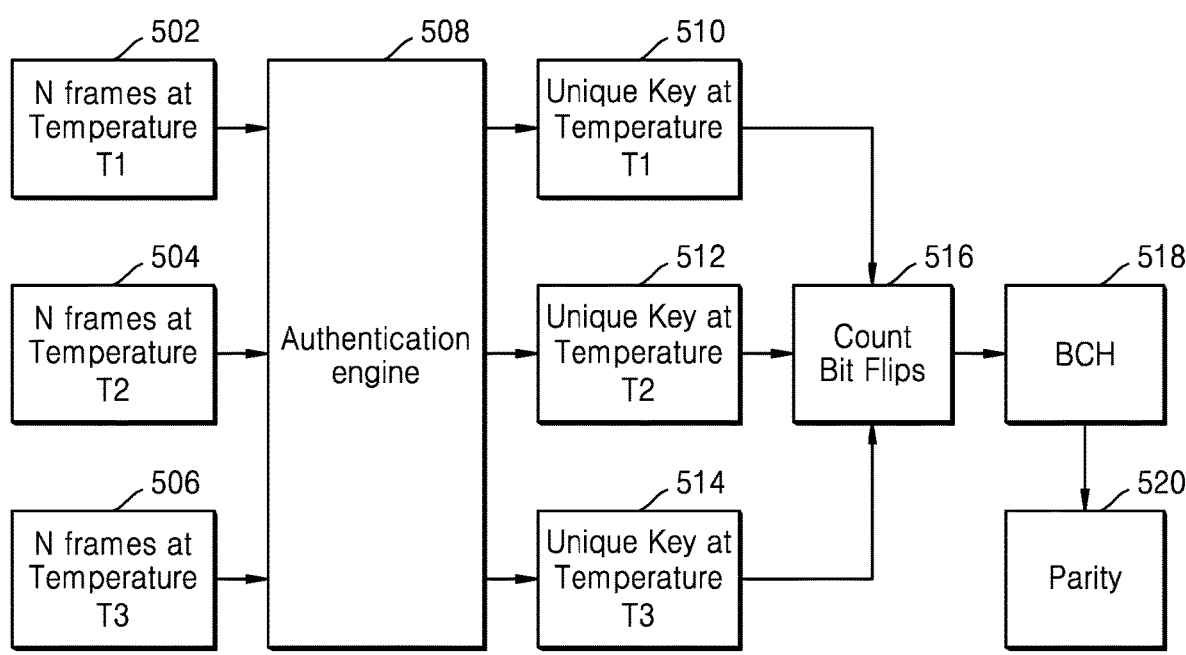
FIG. 5 is a flow diagram illustrating various operations for generating a parity bit for the multiple frames at various temperatures, according to exemplary embodiments of the inventive concept.

FIG. 5 is a flow diagram illustrating various operations for parity bit generation for multiple frames at various temperatures, according to exemplary embodiments of the inventive concept. At 502-506, the authentication engine (160) receives the plurality of frames from the image sensor (150) at various temperatures (e.g., T1=27° c., T2=−5° c., T3=65° c.). At 508, the authentication engine (160) determines the set of optimal OB pixels from the plurality of frames. At 510-514, the authentication engine (160) generates the unique key based on the set of optimal OB pixels for the authentication at various temperatures. At 516, the authentication engine (160) counts the bit flips for each unique key based on the set of optimal OB pixels for the authentication at various temperatures. At 518-520, the authentication engine (160) calculates BCH code (M+m*t<2$^m$) with helper (or parity data) to restore the value back in the case where temperature might cause some bits to change its value. Furthermore, the authentication engine (160) generates the plurality of parity bits from the generated at least one unique key and detects the error based on the generated plurality of parity bits. At 522, using the authentication engine (160), the m*t bits of data are stored in the OTP memory for tuning of the image sensor (150).

In an exemplary embodiment of the inventive concept, the unique key (e.g., PUF key) is exclusive to the electronic device (100). The electronic device (100) does not store the unique key to the memory (110). Hence, the unique key is not available for an external source to hack the unique key.

The methods disclosed herein do not require any additional hardware for generating the unique key. Hence, the methods disclosed herein provide a cost-effective technique for the key generation and the authentication.

In addition, the methods disclosed herein can be used to differentiate a fake CMOS sensor and a genuine CMOS sensor of the electronic device (100).

In addition, the methods disclosed herein can be used to provide a device-level authentication using the CMOS sensor (150) on the electronic device (100) instead of using IMEI or other passcodes which are stored in the electronic device (100). Furthermore, the methods disclosed herein provide watermarking of images captured by the CMOS sensors (150) on the electronic device (100). For example, in the case the authenticity of the image needs to be established, the image can be watermarked with the unique key which can be later used for image authentication.

While the inventive concept has been particularly shown and described with reference to exemplary embodiments thereof, it will be understood that various changes in form and details may be made thereto without departing from the spirit and scope of the inventive concept as set forth in the following claims.

What is claimed is:

1. A method for providing authentication using an image sensor of an electronic device, comprising:
   receiving, by the electronic device, a plurality of frames from the image sensor of the electronic device, wherein each frame includes a plurality of Optical Black (OB) pixels;
   determining, by the electronic device, a set of optimal OB pixels from the plurality of frames; and generating, by the electronic device, a unique key based on the set of optimal OB pixels for the authentication,
wherein determining, by the electronic device, the set of optimal OB pixels from the plurality of frames, comprises:
determining, by the electronic device, location information of a plurality of candidate OB pixels in a first frame of the plurality of frames, wherein the plurality of candidate OB pixels are obtained from the plurality of OB pixels;
storing, by the electronic device, the location information of the plurality of candidate OB pixels;
determining, by the electronic device, location information of a plurality of candidate OB pixels in remaining frames of the plurality of frames:
performing, by the electronic device, an intersection on the stored location information using the location information of the plurality of candidate OB pixels of the remaining frames; and
determining, by the electronic device, the set of optimal OB pixels based on the intersection, wherein the set of optimal OB pixels includes OB pixels that are found in both the first frame and the remaining frames.

2. The method as claimed in claim 1, wherein the plurality of OB pixels are present on an active pixel array of the image sensor.

3. The method as claimed in claim 1, further comprising:
generating, by the electronic device, a plurality of parity bits from the unique key; and
detecting, by the electronic device, an error based on the plurality of parity bits.

4. An electronic device for providing authentication using an image sensor, comprising:
a memory;
a processor; and
an authentication circuit, operably connected to the memory and the processor, the authentication circuit configured to:
receive a plurality of frames from the image sensor of the electronic device, wherein each frame includes a plurality of Optical Black (OB) pixels;
determine a set of optimal OB pixels from the plurality of frames; and
generate a unique key based on the set of optimal OB pixels for the authentication,
wherein when determining the set of optimal OB pixels from the plurality of frames, the authentication circuit is further configured to:
determine location information of a plurality of candidate OB pixels in a first frame of the plurality of frames, wherein the plurality of candidate OB pixels are obtained from the plurality of OB pixels;
store the location information of the plurality of candidate OB pixels;

determine location information of a plurality of candidate OB pixels in remaining frames of the plurality of frames;
perform an intersection on the stored location information using the location information of the plurality of candidate OB pixels of the remaining frames; and
determine the set of optimal OB pixels based on the intersection, wherein the set of optimal OB pixels includes OB pixels that are found in both the first frame and the remaining frames.

5. The electronic device as claimed in claim 4, wherein the plurality of OB pixels are present on an active pixel array of the image sensor.

6. The electronic device as claimed in claim 4, wherein the authentication circuit is further configured to:
generate a plurality of parity bits from the unique key; and
detect an error based on the plurality of parity bits.

7. A method for providing authentication using an image sensor of an electronic device, the method comprising:
receiving, at the electronic device, a plurality of frames from the image sensor, each of the frames including a plurality of Optical Black (OB) pixels;
determining, by the electronic device, a set of OB pixels by performing an operation using location information of the OB pixels of the received frames; and
generating a physically unclonable function (PUF) key based on the set of OB pixels,
wherein determining, by the electronic device, the set of optimal OB pixels from the plurality of frames, comprises:
determining, by the electronic device, location information of a plurality of candidate OB pixels in a first frame of the plurality of frames, wherein the plurality of candidate OB pixels are obtained from the plurality of OB pixels;
storing, by the electronic device, the location information of the plurality of candidate OB pixels;
determining, by the electronic device, location information of a plurality of candidate OB pixels in remaining frames of the plurality of frames;
performing by the electronic device, an intersection on the stored location information using the location information of the plurality of candidate OB pixels of the remaining frames; and
determining, by the electronic device, the set of optimal OB pixels based on the intersection, wherein the set of optimal OB pixels includes OB pixels that are found in both the first frame and the remaining frames.

8. The method of claim 7, wherein the image sensor is a complementary metal oxide semiconductor (CMOS) sensor.

9. The method of claim 7, wherein the electronic device is a mobile device.

* * * * *